United States Patent
Funck et al.

(10) Patent No.: US 6,997,286 B1
(45) Date of Patent: Feb. 14, 2006

(54) METHOD IN AND DEVICE FOR THE MANUAL LUBRICATION OF A PLURALITY OF LUBRICATION POINTS

(75) Inventors: Paer-Olof Funck, Linkoping (SE); Niklas Rehn, Atvidaberg (SE)

(73) Assignee: Assalub AB, Atvidaberg (SE)

( * ) Notice: Subject to any disclaimer, the term of this patent is extended or adjusted under 35 U.S.C. 154(b) by 0 days.

(21) Appl. No.: 10/009,165

(22) PCT Filed: May 18, 2000

(86) PCT No.: PCT/SE00/00979

§ 371 (c)(1),
(2), (4) Date: Nov. 7, 2001

(87) PCT Pub. No.: WO01/02770

PCT Pub. Date: Jan. 11, 2001

(30) Foreign Application Priority Data

Jul. 2, 1999 (SE) .................................. 9902547

(51) Int. Cl.
*F01M 11/04* (2006.01)
(52) U.S. Cl. ...................... 184/105.2; 184/7.4; 222/14; 222/282
(58) Field of Classification Search ................ 189/7.4, 189/6, 105.1, 1.5; 222/14, 282
See application file for complete search history.

(56) References Cited

U.S. PATENT DOCUMENTS

| | | | | |
|---|---|---|---|---|
| 3,779,357 A | * | 12/1973 | Haller et al. ................ | 194/212 |
| 4,263,945 A | * | 4/1981 | Van Ness ..................... | 141/98 |
| 4,519,247 A | * | 5/1985 | Horttonen .................... | 184/7.4 |
| 5,029,672 A | * | 7/1991 | Witczak ....................... | 184/7.4 |
| 5,204,819 A | * | 4/1993 | Ryan ........................... | 705/413 |
| 5,813,496 A | * | 9/1998 | Hyvonen et al. ............. | 184/6.4 |
| 5,873,731 A | * | 2/1999 | Prendergast ................. | 434/262 |
| 5,923,572 A | * | 7/1999 | Pollock ........................ | 700/282 |
| 6,068,164 A | * | 5/2000 | Totaro ......................... | 222/389 |
| 6,123,174 A | * | 9/2000 | Elkin et al. .................. | 184/1.5 |
| 6,125,969 A | * | 10/2000 | Graf et al. ................... | 184/105.1 |
| 6,471,006 B2 | * | 10/2002 | Hulkkonen et al. ......... | 184/6.21 |

FOREIGN PATENT DOCUMENTS

EP          0926426          6/1999

* cited by examiner

Primary Examiner—David Fenstermacher
(74) Attorney, Agent, or Firm—Merchant & Gould P.C.

(57) ABSTRACT

A method and a device for the manual lubrication of a plurality of lubrication points with a quantity of lubricant individually predetermined for each lubrication point. The lubrication points are provided with individual identification elements. Information on the quantity of lubricant that is to be administered to each individual lubrication point in each instance of lubrication is stored in a memory. During lubrication, the lubrication point is identified and information on the predetermined quantity of lubricant is retrieved from the memory, following which lubricant is administered to the lubrication point. Information on the lubrication carried out and the time thereof is stored in the memory. The device includes a lubricant gun with a lubricant reservoir, a pump device, a measuring device with indicating element and a nozzle.

10 Claims, 2 Drawing Sheets

METHOD IN AND DEVICE FOR THE MANUAL LUBRICATION OF A PLURALITY OF LUBRICATION POINTS

BACKGROUND

In the manual lubrication of a machine, for example a papermaking machine, having a plurality of lubrication points, the person carrying out the lubrication has, as an aid to memory, a lubrication diagram containing information on the location of each lubrication point on the machine, the frequency of lubrication for that lubrication point and the requisite quantity of lubricant. Performance of the lubrication is usually confirmed by entering a date and signature for all lubrication points.

It has been shown that information on the lubrication carried out is sometimes incorrect, there being many possible reasons for this, but the important fact is that failure to carry out lubrication may cause serious damage to machinery with machine shutdowns, resulting in lost production. The question of proof is a difficult one when it comes to verifying in the case of a damaged bearing, for example, whether or not lubrication has been carried out in the prescribed manner.

SUMMARY

The object of the present invention is to provide a method of the said type, by means of which the lubrication of all lubrication points with the correct quantity of lubricant can be ensured and in which the lubrication is reliably documented.

DESCRIPTION OF THE DRAWINGS

The invention will be explained in more detail below with reference to the attached drawings, in which.

DETAILED DESCRIPTION

Figure 1:
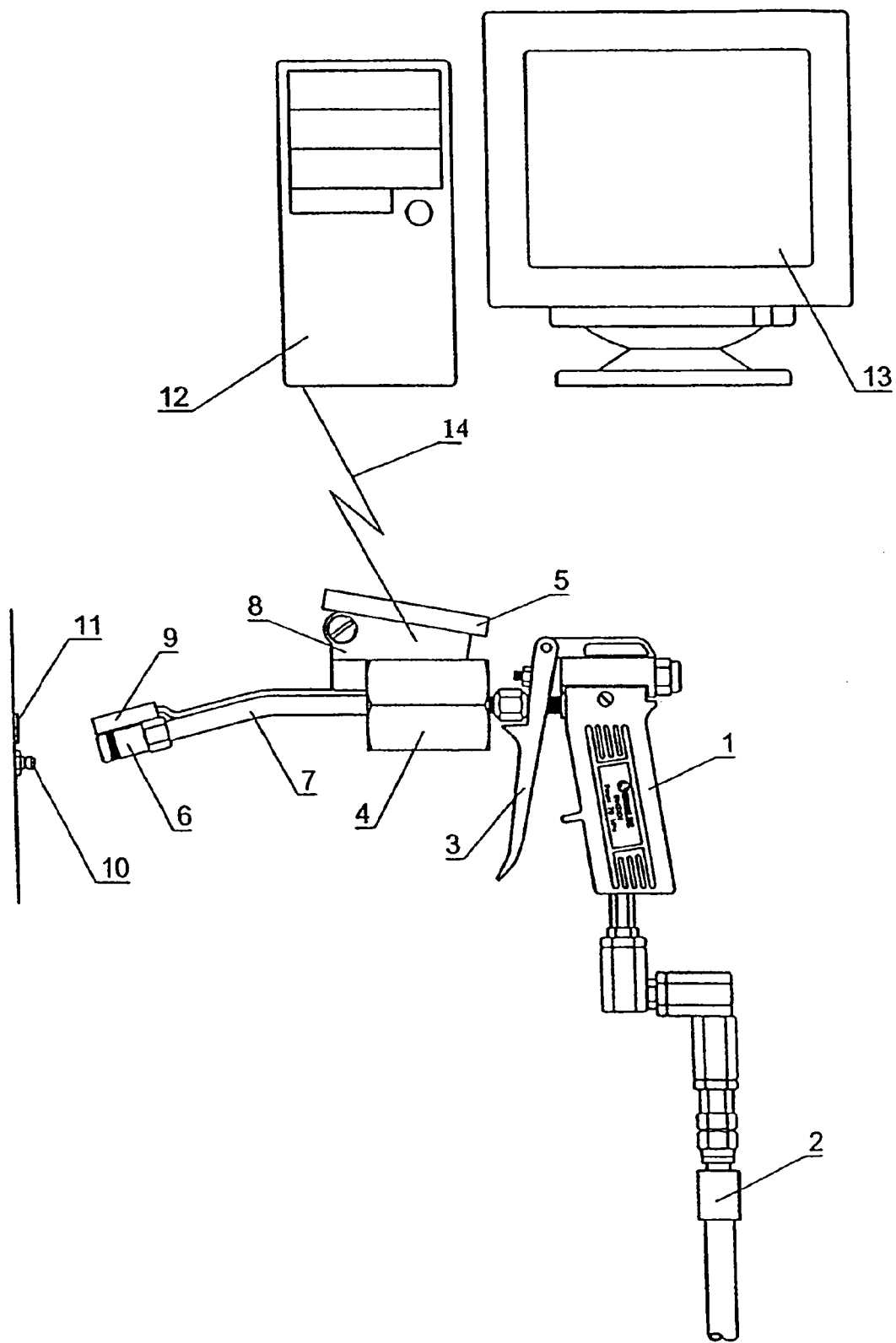
FIG. 1 shows a diagram of a device according to the invention.

In the drawing 1 generally denotes a lubricant gun, which is connected by way of a line 2 to a lubricant reservoir (not shown). The gun contains a pump, which is manually actuated by means of a lever 3, and a measuring device 4 with indicating element 5. The lubricant reservoir is connected by way of the line 2, the pump device and the measuring device 4 to a nozzle 6 arranged on a tube 7.

A control element 8, on the casing of which the indicating element 5 is suitably mounted, is connected to the measuring device 4, the pump device and lubrication point identification device 9 arranged at the nozzle 6. The said identification device is designed to interact with an identification element 11, assigned to each lubrication point 10 and located so that when the nozzle 6 is connected to the nipple of the lubrication point 10 the lubrication point identification device is capable of reading off the information in the identification element that is unique to the lubrication point in question.

In the embodiment shown in FIG. 1 the control element 8 is designed to be connected by radio communication, shown by a line 14, to a fixed computer 12, the memory of which contains data on the lubrication requirement of each separate lubrication point. By means of radio communication, therefore, information on the quantity of lubricant for each separate lubrication point is transmitted to the control element 8, and information on the lubrication performed at the individual lubrication points is transmitted from the control element 8 to the memory of the computer, so that following a lubrication round the computer memory contains information on which lubrication points have been visited and what quantity of lubricant has been administered. It is thereby possible to produce a lubrication report either on the screen 13 of the computer 12 or in a conventional printout, in which there is the facility for specially identifying any lubrication points missed.

Radio communication implies communication in real time. The scope of the invention obviously also includes communication by other means based, for example, on infrared technology, and an alternative embodiment, according to which the control element 8 contains a memory, which can be connected to the memory of the computer 12 in such a way that prior to a lubrication round information regarding the quantity of lubricant is fed to the memory of the control element 8 and following the lubrication round the memory of the computer 12 is updated by a transfer of information from the memory of the control element 8.

Figure 2:
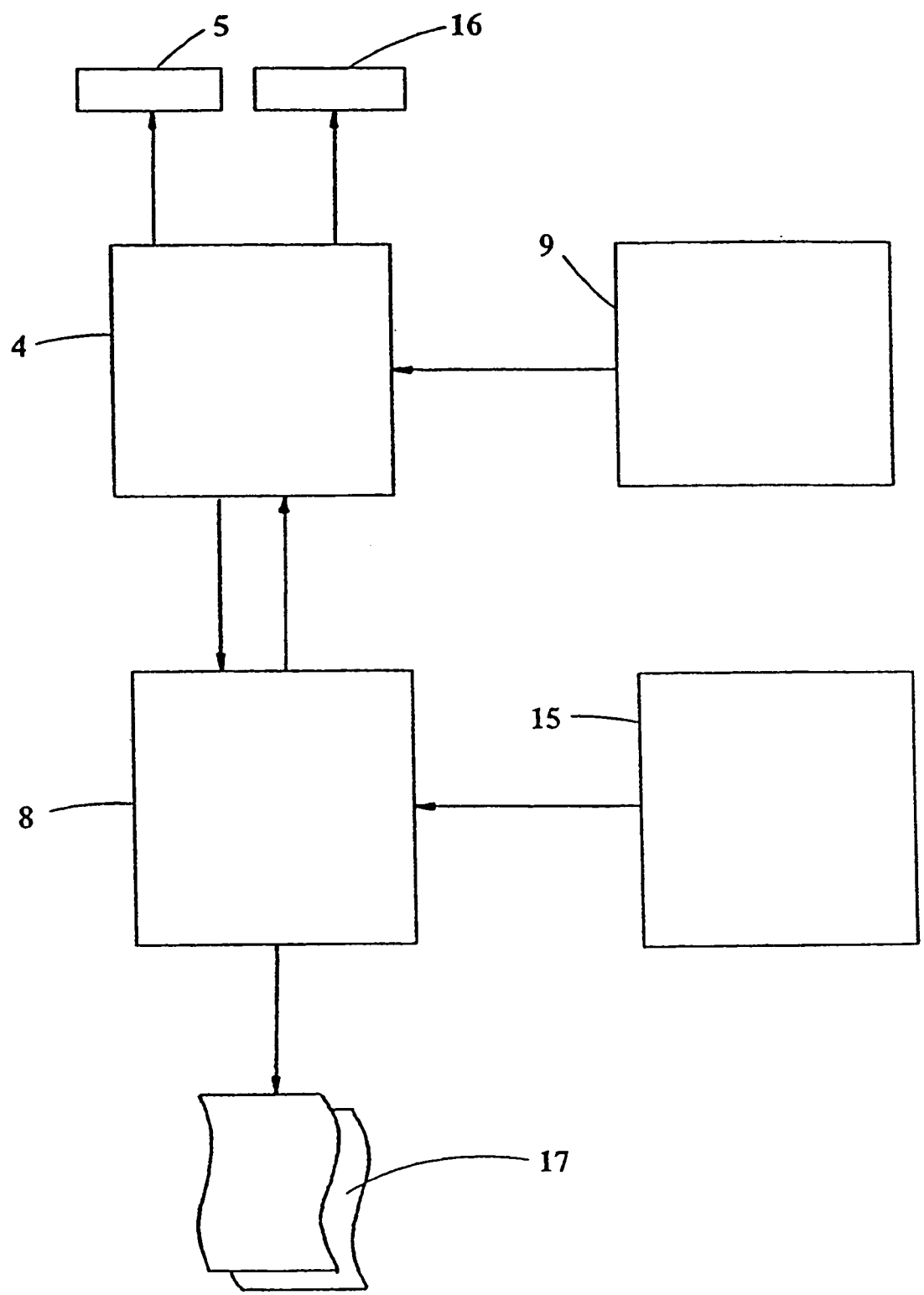
FIG. 2 illustrates the functioning thereof.

Referring to FIG. 2, it will now be explained what happens before, during and after a lubrication round. It will be obvious that the process differs depending on whether the control element 8 of the lubricant gun 1 is designed to communicate with the computer 12 in real time or whether the control device 8 is equipped with a memory that is coupled to the computer 12 for the exchange of information before and after a lubrication round. In the first aforementioned case the information is transferred between the computer 12 and the control element 8 instead of to each separate lubrication point. In FIG. 2 the transmission of the lubrication requirement of each lubrication point to the control element 8 is indicated by a block 15. The person carrying out the lubrication round, hereinafter called the greaser, either follows a predetermined lubrication route or carries out the lubrication round in the individual lubrication point order indicated on the indicating element 5 of the lubrication gun 1. When the nozzle 6 of the lubricant gun 1 is connected to a lubrication point 10, information on the lubrication point in question is obtained automatically by means of identification elements 11 belonging to the lubrication point in question and the identification device 9 of the lubricant gun 1 on the indicating element 5. Information on the quantity of lubricant that is to be administered to the lubrication point is either stored in the control element 8, or it is fed to the latter in real time from the computer 12 and this information shown on the indicating element 5, when the identity of the lubrication point has been verified. The greaser begins dosing the lubrication point and can continuously see on the indicating element 5 how much lubricant has been fed in by means of the measuring device 4, or alternatively what quantity of lubricant still remains to be administered to the lubrication point (countdown). An audible alarm device 16 is appropriately designed to warn the greaser that the set dosage has been reached. Information on the lubrication performed is stored in the control unit 8 or is transmitted in real time to the computer 12. In FIG. 2, information lists 17 symbolize the fact that this information can be taken from the control element 8, but it will be obvious that corresponding information can be retrieved from the fixed computer 12 or shown on the screen 13.

If, after completing a lubrication round, there are one or more lubrication points that have not been visited, a warning to this effect is received from the control unit 8 either on the screen 13 or through a separate print-out. There is therefore no risk whatsoever of damage possibly occurring as a result of failure to carry out lubrication.

What is claimed is:

1. A system for manual lubrication of an apparatus having a plurality of lubrication points with a quantity of lubricant individually predetermined for each lubrication point, wherein
the lubrication points of the apparatus are provided with an-identification element, based upon which information on the quantity of lubricant that is to be administered to each individual lubrication point in each instance of lubrication is retrievable from a fixed computer memory, wherein
the lubricant is delivered by a lubricant gun having a lubrication nozzle adapted for contacting a single lubrication point at a time, and wherein,
in the lubrication of a lubrication point of the apparatus, the identification element associated with the lubrication point is detected by a lubrication point identification device arranged at the lubrication nozzle and information on the predetermined quantity of lubricant for the lubrication point identified is retrieved from the fixed computer memory,
following which the quantity of lubricant is administered to the lubrication point, and information on the lubrication carried out is stored in the fixed computer memory.

2. System according to claim 1, wherein, in connection with a planned lubrication round, information on the quantities of lubricant for each individual lubrication point stored in the fixed computer memory is transmitted from the fixed computer memory to a second, mobile memory and that, after carrying out the lubrication round, the information is transmitted from the mobile memory to the fixed computer memory.

3. System according to claim 1, wherein, on identification of an individual lubrication point, the quantity of lubricant is shown that is to be administered to the lubrication point in question and that, when the quantity has been administered, the administration is shown and/or indicated by audible means.

4. System according to claim 1, wherein a list of lubrication points visited during a lubrication round and the quantity of lubricant individually administered to each lubrication point is retrieved from the fixed computer memory.

5. System according to claim 1, wherein the time for a subsequent lubrication round and information on the quantity of lubricant for the individual lubrication points is calculated from information stored in the memory.

6. A device for manual lubrication of an apparatus having a plurality of lubrication points with a quantity of lubricant individually predetermined for each lubrication point, wherein the device comprises:
an identification element unique to the lubrication point at each lubrication point of the apparatus,
a lubricant gun with a lubricant reservoir, which is connected by way of a pump device and a measuring device with indicating element to a nozzle adapted for contacting a single lubrication point at a time, and
a control element connected to the measuring device and the pump device, connected to which control element is a mobile memory containing stored data on the lubrication requirement of each individual lubrication point of the apparatus, with which mobile memory the lubricant gun is designed to communicate for transfer to the control element of a lubricant quantity specification for each separate lubrication point and for feeding information stored in the control element on the lubrication carried out at the individual lubrication points,
and a lubrication point identification device arranged in connection with the nozzle and designed, when the nozzle is connected to a lubrication point, to automatically identify the lubrication point in question and its lubrication requirement by means of the identification element, together with means for storing in the mobile memory data on the quantity of lubricant administered to the lubrication point in question in each lubrication operation.

7. Device according to claim 6, wherein the device comprises communications equipment designed to achieve communication between the control element and a fixed computer.

8. Device according to claim 7, wherein the communications equipment is radio communications equipment.

9. Device according to claim 7, wherein the control element comprises mobile memory elements designed to store the data and information for a time interval between a beginning and end of one lubrication round and wherein the mobile memory elements are designed to communicate with the fixed computer memory.

10. A lubricant gun for manual lubrication of an apparatus having a plurality of lubrication points with a quantity of lubricant individually predetermined for each lubrication point, the lubricant gun comprising:
a lubrication nozzle adapted for contacting a single lubrication point at a time, that is adapted to be connected, by way of a pump device, to a lubricant reservoir;
a measuring device adapted for measuring an amount of fed lubricant;
a control element connected to the measuring device and the pump device;
a mobile memory connected to the control element and containing stored data on a lubrication requirement of each individual lubrication point of the apparatus; and
a lubrication point identification device arranged in connection with the nozzle and adapted, when the nozzle is connected to one of the plurality of lubrication points, to automatically identify the lubrication point and associated lubrication requirement using an identification element unique to the lubrication point;
wherein the mobile memory communicates to the control element a lubricant quantity specification for each one of the plurality of lubrication points, and feeding information stored in the control element on the lubrication carried out at each one of the plurality of lubrication points is stored in the mobile memory.

* * * * *